United States Patent [19]
Kubo et al.

[11] 3,920,708
[45] Nov. 18, 1975

[54] PROCESS FOR PREPARING GLYCIDOL

[75] Inventors: Masayoshi Kubo; Yuji Nakazawa; Katuhiko Takahashi, all of Saitama, Japan

[73] Assignee: Daicel Ltd., Osaka, Japan

[22] Filed: Dec. 14, 1973

[21] Appl. No.: 424,642

[30] Foreign Application Priority Data
Dec. 27, 1972  Japan.................................. 47-1518

[52] U.S. Cl............................................ 260/348.5 L
[51] Int. Cl.².......................................... C07D 303/14
[58] Field of Search ............................. 260/348.5 L

[56] References Cited
UNITED STATES PATENTS
3,509,183  4/1970  Wenzke et al. ............... 260/348.5 L
3,655,524  4/1972  Mednick ....................... 260/348.5 L

FOREIGN PATENTS OR APPLICATIONS
1,509,277  12/1967  France

*Primary Examiner*—Norma S. Milestone
*Attorney, Agent, or Firm*—Woodhams, Blanchard and Flynn

[57] ABSTRACT

A process for preparing glycidol by an epoxidation reaction of allyl alcohol with peracetic acid in which an organic compound having a boiling point higher than that of acetic acid, (a mixture of which organic compound with glycidol separates into two layers, i.e., an organic compound layer and a glycidol layer, when cooled to ambient temperature or lower), either is (1) added to the reaction mixture after completion of the epoxidation reaction or (2) is employed as the reaction solvent or as a part of the reaction solvent in the epoxidation reaction system. Acetic acid and compounds having boiling points lower than that of acetic acid are distilled out of the reaction mixture after the completion of the reaction. The bottom comprises a layer rich in glycidol and a layer lacking in glycidol.

10 Claims, 1 Drawing Figure

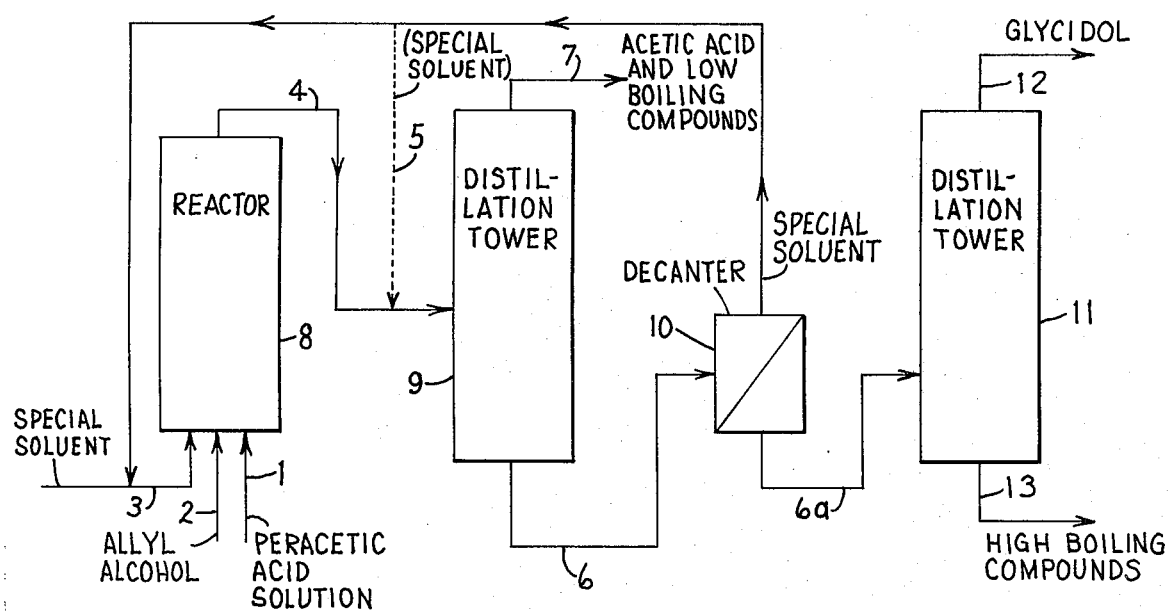

PROCESS FOR PREPARING GLYCIDOL

BACKGROUND OF THE INVENTION

This invention relates to a process for preparing glycidol by the epoxidation reaction of allyl alcohol with peracetic acid.

DESCRIPTION OF THE PRIOR ART

Glycidol can be prepared by epoxidation of allyl alcohol. The epoxidation reaction can be carried out with peracetic acid in a suitable solvent, particularly, an organic solvent. The epoxidation reaction proceeds relatively rapidly. Due to the high reactivity of the oxirane ring of the thus obtained glycidol, polymerized or ring-opened side-reaction products can be formed by exposure to heat, an acidic substance or a basic substance. A most important requirement in the process for preparing glycidol from allyl alcohol by epoxidation with peracetic acid is to control the side reactions caused by acetic acid contained in the reaction liquor or to separate acetic acid from glycidol as rapidly as possible.

The epoxidation of allyl alcohol with peracetic acid has been effected by using, as solvent, a low boiling compound such as acetone or ethyl acetate or a high boiling compound such as diisobutylketone, o-xylene or cumene. Each of these organic solvent compounds forms an homogeneous mixture with glycidol. So far as we are aware it has not heretofore been suggested to employ a compound which forms a heterogeneous mixture with glycidol, as the reaction solvent or as a component of the reaction solvent.

There are several known processes for the isolation of glycidol from a reaction mixture comprising high boiling compounds, allyl alcohol, solvent(s), water and decomposition products of organic peroxides, which reaction mixture is obtained by the epoxidation reaction of allyl alcohol with an organic peroxide.

One of the processes is disclosed in U.S. Pat. No. 3,374,153 wherein glycidol is first separated from allyl alcohol by distillation and then high boiling substances are removed from the separated glycidol by a second distillation. In the second stage of the process, glycidol is distilled out as an azeotropic mixture and glycidol is then isolated from the azeotrope by extraction with water. Water is then removed from the aqueous glycidol solution by evaporation and glycidol is purified by vacuum distillation.

This prior process includes three steps wherein glycidol is heated and, therefore, the loss of glycidol due to the heat treatment is appreciable. Particularly, the loss of glycidol due to hydration is considerable. Further, the distillation of water incurs increased expense because of its large specific heat and latent heat of evaporation.

According to the process disclosed in U.S. Pat. No. 3,509,183, epoxidation of allyl alcohol is carried out by a reaction-distillation method with peracetic acid in an organic solvent having a boiling point higher than 126°C and which forms an azeotropic mixture with glycidol, which mixture retains its homogeneous state when cooled to room temperature. Unreacted allyl alcohol and low boiling substances are removed at the top of the tower, and the bottom comprises a mixture of glycidol, acetic acid, solvent and high boiling substances. From this latter mixture, acetic acid is then removed at the top of a further tower and the high boiling substances are removed from the bottom thereof by distillation. An azeotropic mixture of glycidol and solvent is obtained as a side cut. The specification is silent on the separation of glycidol from the azeotropic mixture.

A process for the isolation of glycidol from an azeotropic mixture is disclosed in the specification of Japanese Pat. Publication No. 5510/1971. According to this process, a solvent having a boiling point higher than 80°C but lower than that of the solvent contained in the azeotropic mixture, and which forms a low boiling azeotropic mixture at a temperature lower than the azeotropic point, is added to the mixture. The azeotropic mixture distilled out at the top of the tower is cooled to room temperature and is thereby converted to a heterogeneous solution. The layer rich in glycidol is further subjected to vacuum distillation to obtain pure glycidol. If this process is combined with the process of U.S. Pat. No. 3,509,183, three distillations must be carried out to obtain pure glycidol, not counting the reaction distillation. The loss of glycidol due to the heating is considerable, particularly, the loss of glycidol due to the contact of glycidol with acetic acid at a temperature near 100°C during the reaction. In addition, the process is complicated due to, for example, the side cut required in the process of U.S. Pat. No. 3,509,183.

Generally, in the preparation of peracetic acid by the liquid phase oxidation of acetaldehyde, the solvents which can be used are limited, in view of the oxidation velocity of acetaldehyde and decomposition of the formed peroxide. It has been known that peracetic acid can be obtained in a high yield if a low boiling organic solvent such as ethyl acetate or acetone is used. Peracetic acid solutions containing such a low boiling solvent have been prepared on a commercial scale.

If the epoxidation reaction is carried out using a peracetic acid solution containing such a solvent, generally, the resulting epoxide can be separated from the reaction system and purified easily to obtain the final product in a high yield. However, as stated above, glycidol has a high reactivity and it is apt to undergo a ring cleavage reaction thereby lowering the yield remarkably, if it is heated together with acetic acid for a long time. Although losses in the reaction system can be minimized by controlling the reaction temperature, it is difficult to isolate and purify glycidol, especially from acetic acid at a low temperature in the purification, particularly purification operations which include distillation, because the degree of vacuum or the operation temperature is limited.

SUMMARY OF THE INVENTION

According to the process of this invention, loss of glycidol caused by contact thereof with acetic acid can be minimized and glycidol can be recovered easily by adding an organic special solvent (having a boiling point higher than that of acetic acid, and a mixture of which with glycidol will separate into two layers when it is cooled to ambient temperature or a lower temperature) to the reaction system either (1) before or during the epoxidation reaction to prepare glycidol or (2) to the reaction mixture liquor containing glycidol after completion of the epoxidation reaction.

More particularly, in the process of this invention in the first distillation of the reaction mixture carried out after completion of the epoxidation reaction, acetic acid and lower boiling compounds are distilled out as vapor at the top of the tower. The liquid glycidol solution recovered at the bottom of the still is separated into a first layer mainly comprising glycidol and a second layer containing the special solvent at around ambient (room) or lower temperature. The layer rich in glycidol is then subjected to vacuum distillation to obtain pure glycidol.

The process of the present invention is very inexpensive because pure glycidol is obtained by a process involving only two distillation steps, and the loss of glycidol is thus very small. In other words, by adding the special solvent in accordance with the invention, acetic acid can be separated from the system efficiently. It is effective to add the special solvent in an amount of from 10 volume percent to 100 volume percent, based on the volume of the reaction mixture.

The special solvents used in the process of this invention have the following properties:
1. The special solvents are inert to glycidol and they have boiling points higher than that of acetic acid.
2. A mixture of the special solvent and glycidol separates into two layers by cooling it to around ambient temperature or a lower temperature, one layer being rich in glycidol and the other layer having a low glycidol content. If the special solvent is added to the reaction system prior to or during the reaction, it can be a solvent for the reaction at the reaction temperature and it can replace all or part of the usual reaction solvent. The special solvent must have the property of substantially separating from glycidol on cooling to ambient or lower temperature. Ambient temperature means room temperature, i.e. about 18° to 25°C.

If the special solvent is added to the reaction system prior to or during the reaction, it should also be inert to peracetic acid. But the special solvent need not possess this latter property if it is added after completion of the epoxidation reaction.

As special solvents which possess the above described properties and which can be added before or during the epoxidation reaction, there can be enumerated straight chain, saturated hydrocarbons such as n-octane, n-nonane, n-decane and n-dodecane; branched, saturated hydrocarbons such as iso-octane, iso-decane and iso-dodecane; alicyclic hydrocarbon compounds such as methylcyclo hexane and tetralin; aromatic hydrocarbons such as pseudocumene, p-cymene and durene; and ethers such as n-butyl ether and isoamyl ether.

Stated differently, the above special solvents are selected from a saturated aliphatic hydrocarbon (alkane) containing 8 to 14 carbon atoms, preferably 8 to 12 carbon atoms, an alicyclic hydrocarbon compound such as a cycloalkane containing 7 to 12 carbon atoms, preferably 7 to 10 carbon atoms, an aromatic hydrocarbon containing 9 to 10 carbon atoms, and an alkyl ether containing 8 to 12 carbon atoms, preferably 8 to 10 carbon atoms.

Special solvents which can be added after the epoxidation reaction is completed and at the time of the distillation are all of the above solvents plus unsaturated aliphatic hydrocarbons (alkenes) having 8 to 14 carbon atoms, preferably 8 to 12 carbon atoms, such as decene and dodecene.

The special solvents do not form an azeotrope with glycidol.

DETAILED DESCRIPTION OF PREFERRED EMBODIMENTS

The drawing is a schematic diagram of apparatus for practicing the process of the present invention.

In the drawing:

1–6 are lines (pipes), 8 is a reactor, 9 is a distillation tower (acetic acid-removing tower), 10 is a decanter, and 11 is a glycidol-removing distillation tower.

The process of the present invention will be further described with reference to the accompanying drawing.

A peracetic acid solution (the solvent of this last-named solution is preferably a low boiling solvent such as acetone or ethyl acetate) is fed through line 1 to the reactor 8 and allyl alcohol is fed to said reactor through the line 2. In one embodiment of the invention, the special solvent is fed into the reactor 8 through a line 3. In a second embodiment of the invention, the special solvent is not fed through line 3.

The reaction temperature is preferably above 30°, and preferably about 30°–60°C. The molar ratio of allyl alcohol to peracetic acid is 0.7 to 1.3:1, preferably about 1:1. As stated above, by adding the special solvent during the reaction of allyl alcohol and peracetic acid to prepare glycidol as above, the yield of glycidol and the reaction velocity are increased remarkably as compared with the case wherein the special solvent is not used.

An increase in the reaction velocity of about 20–50% has been observed due to addition of the special solvent. Also, the yield of glycidol (85%) was far higher than was obtained when no special solvent was used (78%). This was not expected.

The reaction liquid containing glycidol is fed into a distillation tower 9 through line 4. In the second embodiment of the invention, wherein the special solvent is not added through line 3 during the reaction, the special solvent is fed through line 5 to the stream flowing through line 4. By the addition of the special solvent, the loss of glycidol during distillation in tower 9 can be reduced considerably as compared with the case wherein only the reaction liquor is fed directly into the distillation tower 9. It will also be understood that part of the special solvent can be fed into line 3 and simultaneously the remainder thereof can be fed through line 5.

The rate of recovery of glycidol is increased to 90% or higher by the presence of the special solvent in the liquid that undergoes distillation in tower 9 according to the invention, whereas the rate of recovery is only about 60% if the reaction liquor free of special solvent is distilled directly in tower 9. Such a high rate of recovery is surprising in the distillation of an unstable substance such as glycidol. At the top of the distillation tower (acetic acid-removing tower) 9, acetic acid and compounds having boiling points lower than that of acetic acid are obtained and are sent to a recovery system through line 7. At the bottom of the tower, a heterogeneous mixture of glycidol and the special solvent is obtained. Most preferably, the distillation in tower 9 is effected by continuous, vacuum distillation. The preferred temperature at the bottom of the tower 9 is less than 100°C, although this depends upon the residence time. The pressure at the tower top is regulated according to the temperature.

The heterogeneous mixture is sent from the bottom of tower 9 into a decanter 10 through a line 6. In the decanter, the heterogeneous mixture separates into an upper layer comprised mainly of the special solvent and lower layer comprised of glycidol and high boiling compounds.

The decanter used may be of a type generally employed for decantation.

The special solvent layer is directly returned to the reaction tower 8 or to the distillation tower 9 through lines 3 and 5 and, therefore, the quantity of the solvent needed for make-up purposes is small.

The lower layer containing glycidol is fed through line 6a into the second distillation tower (high boiling compound-removing tower) 11. In this tower, glycidol is separated from the high boiling compounds. Pure glycidol is obtained at the tower top 12. At the tower bottom 13, the high boiling compounds are recovered.

The distillation tower 11 used in this step can be any simple tower such as a one-stage flash distillation tower or Smith evaporator in order to obtain glycidol of a purity of about 99%. If a higher purity is needed, this can be attained by using a distilling apparatus having about 10 stages. The distillation is effected preferably by continuous vacuum distillation. The degree of vacuum, which has an interrelationship with the residence time, can be such that glycidol is not heated to a temperature above 100°C. The high boiling compounds comprise mainly diglycerol and its ester with acetic acid which can be used efficiently for various industrial field purposes.

Thus, the process of the present invention for the preparation of glycidol is excellent. The number of steps is reduced and the loss of glycidol caused by contact with acetic acid or the like is reduced greatly by the addition of the special solvent.

The present invention will be further described by reference to the following illustrative examples.

EXAMPLE 1

960 Grams of allyl alcohol were charged in a reaction vessel provided with a reflux condenser, thermometer and stirrer. 4600 Grams of an ethyl acetate solution, containing 25 wt.% peracetic acid and 15 wt.% acetic acid, were charged therein by means of a quantitative feeding pump over a time period of about 1 hour. After completion of the feeding, the mixture was kept at 50°C to complete the reaction. The yield of glycidol, based on the peracetic acid fed in, was 78%, according to gas chromatography.

To the reaction liquor, decene was added in a volume of ½ the volume of the reaction liquor. The mixed solution maintained an homogeneous state. The mixture, containing 12 wt.% glycidol, was fed into an Older-Shaw distillation tower of a diameter of 40 mm. The distillation tower was comprised of a cooling condenser, variable reflux device provided with a thermometer, an uppermost first plate part comprising 5 plates, a first inlet provided with a thermometer, a second plate part comprising 10 plates, a second inlet provided with a thermometer, a third plate part comprising 10 plates, a third inlet provided with a thermometer, a fourth plate part comprising 10 plates, a fourth inlet provided with a thermometer, a lowermost fifth plate part comprising 5 plates and a reboiler provided with a thermometer, all arranged in the described order from top to bottom. In the reboiler part, a line is provided which runs to the decanter through the condenser.

The feed materials were fed through the second inlet located at the 15th stage from the top, at a tower top pressure of 30 mmHg, a reflux ratio of 1.5 and the rate of charging of said solution being 600 ml/hr. The temperature measured by the respective thermometers (top to bottom) during the distillation were 26°C, 34°C, 52°C, 73°C, 76°C and 92°C. The results of this distillation are shown in Table I.

COMPARISON EXAMPLE

The same reaction liquor obtained in the reaction vessel as described in Example 1 was fed directly into the above-described distillation tower without the addition of decene, and the distillation was carried out in the same manner as in Example 1. The results of this distillation are shown in Table I.

EXAMPLE 2

In the preparation of glycidol in the same manner as described in Example 1, 1 liter of pseudocumene was added to the allyl alcohol fed into the reaction vessel, which was then reacted with peracetic acid in the same manner as described in Example 1. The reaction was completed at 50°C after 3 hours. The yield of glycidol was 85%, based on the peracetic acid fed in.

The reaction liquor was fed directly into the same distillation tower as in Example 1 under the same conditions. The results of this distillation are shown in Table I.

EXAMPLE 3

Three liters of n-decane were used in place of pseudocumene used in Example 2. The results are shown in Table I.

EXAMPLE 4

The bottoms obtained in Examples 1 and 2 were introduced into a decanter, cooled to ambient temperature (22°C) and then separated into two layers. The lower layer containing glycidol was fed into a Smith evaporator having a pressure of 10 mmHg and a wall temperature regulated to be 100°C, at a velocity of 300ml/hr. The results are shown in Table II.

EXAMPLE 5

The lower layer containing glycidol, obtained by cooling to ambient temperature the bottoms obtained in Example 1 and 2, were fed into an Alder-Shaw distillation tower of a diameter of 40 mm. The distillation tower was comprised of a cooling condenser, a variable reflux device provided with a thermometer, a plate part comprising 5 plates, an inlet provided with a thermometer, a plate part comprising 5 plates and a reboiler provided with a thermometer, arranged in that order from top to bottom. The tower top pressure was 10 mmHg and the temperatures of the respective thermometers were 52°C, 70°C and 80°C. The reflux ratio was fixed at 0.5. The feed rate was 120 ml/hr. The results are shown in Table II.

Table I

| | Glycidol Formation and Results of the First Distillation | Comparison example | Example 1 | Example 2 | Example 3 |
|---|---|---|---|---|---|
| Reaction | Special solvent | none | none | Pseudo-cumene | n-Decane |
| | Yield of glycidol (based on peracetic acid) | 78% | 85% | 85% | 85% |
| | Consumption velocity of peracetic acid | $6.05 \times 10^{-1}$ [kgmol$^{-1}$hr$^{-1}$] | | $8 \times 10^{-1}$ | $7.8 \times 10^{-1}$ |
| The first distillation | Solvent Added After Reaction | None | Decene | None | None |
| | Quantity of reaction mixture fed(g) | 1500 | 2923 | 1400 | 1970 |
| | Distillate(g) | 1175 | 1791 | 883 | 1541 |
| | Bottom {Upper layer(g) | | 645 | 311 | 154 |
| | {Lower layer(g) | 317 | 420 | 198 | 305 |
| | Weight balance(%) | 99.5 | 97.7 | 99.4 | 101.5 |
| | Glycidol balance(%) | 56.6 | 92.0 | 90.0 | 92.0 |
| | Composition of the lower layer {Glycidol(wt%) | 40.6 | 68.7 | 70.3 | 78.0 |
| | {Solvent(wt%) | none | 1.0 | 11.1 | 0.5 |

Table II

| Results of the Second Distillation | Example 4 Smith Evaporator | Example 5 10-stage Adler-Shaw |
|---|---|---|
| Recovery rate of glycidol (wt. %) | 99 | 98 |
| Composition of distillate, (wt. %) | | |
| Glycidol | 99 | 100 |
| High boiling compounds | 1 | none |

We claim:

1. A process for producing glycidol, which comprises: reacting, in the liquid phase, allyl alcohol with a solution of peracetic acid dissolved in a first solvent selected from the group consisting of ethyl acetate and acetone, in the presence of a second organic solvent which is inert to peracetic acid and to glycidol, which has a boiling point higher than that of acetic acid and which separates from glycidol on cooling to a temperature of about 18° to 25°C or lower, the amount of said second solvent being from 10 volume percent to 100 volume percent, based on the combined volumes of allyl alcohol and said peracetic acid solution, whereby to produce a reaction product mixture consisting essentially of glycidol, acetic acid, said first solvent, said second solvent, low boiling compounds and high boiling compounds; distilling said reaction product mixture and removing acetic acid and compounds having lower boiling points than that of acetic acid, as the overhead, and recovering a heterogeneous liquid residue consisting essentially of glycidol, said second solvent and said high boiling compounds; cooling said liquid residue to a temperature of about 18° to 25°C or lower to separate same into a first phase containing said second solvent and a second phase containing glycidol and said high boiling compounds; and distilling said second phase and recovering substantially pure glycidol, as the overhead.

2. The method of claim 1 wherein said second organic solvent is selected from a saturated aliphatic hydrocarbon containing 8 to 14 carbon atoms, an alicyclic hydrocarbon compound containing 7 to 12 carbon atoms, an aromatic hydrocarbon containing 9 to 10 carbon atoms, and an alkyl ether containing 8 to 12 carbon atoms.

3. The method according to claim 1 wherein the first phase comprising said second organic solvent is recycled to the reaction step.

4. The method according to claim 1 wherein the solution of peracetic acid fed to the reaction step contains acetic acid as an impurity.

5. The method according to claim 1 wherein the oxidation is carried out at a temperature of from 30° to 60°C, and the molar ratio of allyl alcohol to peracetic acid is 0.7 to 1.3:1.

6. A process for producing glycidol, which comprises: reacting, in the liquid phase, allyl alcohol with a solution of peracetic acid dissolved in a first solvent selected from the group consisting of ethyl acetate and acetone to obtain a reaction product containing acetic acid, glycidol and said first solvent; adding to the reaction product after completion of the reaction a second organic solvent which is inert to peracetic acid and to glycidol, which has a boiling point higher than that of acetic acid and which separates from glycidol on cooling to a temperature of about 18° to 25°C or lower, the amount of said second solvent being from 10 volume percent to 100 volume percent, based on the combined volumes of allyl alcohol and said peracetic acid solution, whereby to produce a mixture consisting essentially of glycidol, acetic acid, said first solvent, said second solvent, low boiling compounds and high boiling compounds; distilling said mixture and removing acetic acid and compounds having lower boiling points than that of acetic acid, as the overhead, and recovering a heterogeneous liquid residue consisting essentially of glycidol, said second solvent and said high boiling compounds; cooling said liquid residue to a temperature of about 18° to 25°C or lower to separate same into a first phase containing said second solvent and a second phase containing glycidol and said high boiling compounds; and distilling said second phase and recovering substantially pure glycidol, as the overhead.

7. The method of claim 6 wherein said second organic solvent is selected from an aliphatic saturated or unsaturated hydrocarbon containing 8 to 14 carbon atoms, an alicyclic hydrocarbon compound containing 7 to 10 carbon atoms, an aromatic hydrocarbon containing 9 to 10 carbon atoms, and an alkyl ether containing 8 to 12 carbon atoms.

8. The method of claim 6 wherein the first phase comprising said second organic solvent is recycled to the reaction product before the reaction product undergoes the first distillation.

9. The method according to claim 6 wherein the solution of peracetic acid fed to the process contains acid as an impurity.

10. The method according to claim 6 wherein the oxidation is carried out at a temperature of from 30° to 60°C, and the molar ratio of allyl alcohol to peracetic acid is 0.7 to 1.3:1.

* * * * *

UNITED STATES PATENT OFFICE
CERTIFICATE OF CORRECTION

Patent No. 3,920,708     Dated November 18, 1975

Inventor(s) Masayoshi Kubo; Yuji Nakazawa and Katuhiko Takahashi

It is certified that error appears in the above-identified patent and that said Letters Patent are hereby corrected as shown below:

Col. 10, line 1; before "acid" insert ---acetic---.

Signed and Sealed this fifteenth Day of June 1976

[SEAL]

Attest:

RUTH C. MASON
Attesting Officer

C. MARSHALL DANN
Commissioner of Patents and Trademarks